Feb. 7, 1967 L. W. POLLOCK 3,303,000
PRODUCTION OF CARBON BLACK
Filed March 15, 1963 2 Sheets-Sheet 2
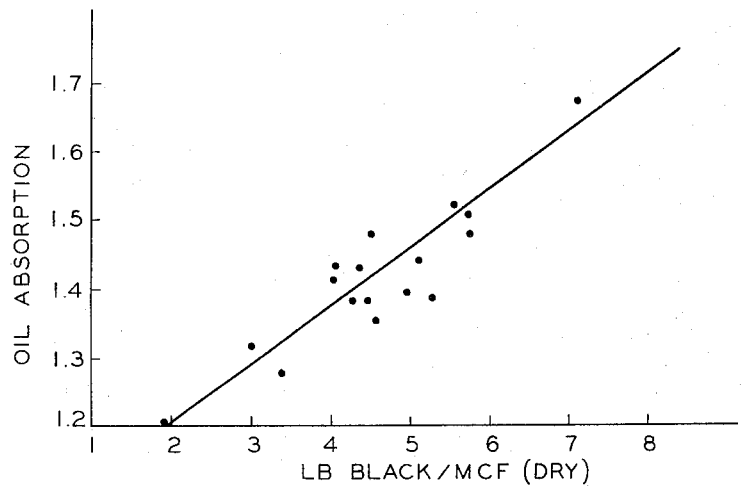
FIG. 4 CARBON BLACK CONCENTRATION VS OIL ABSORPTION
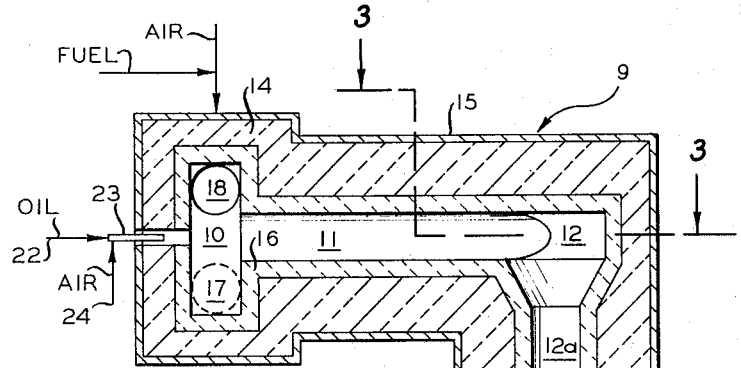
FIG. 2
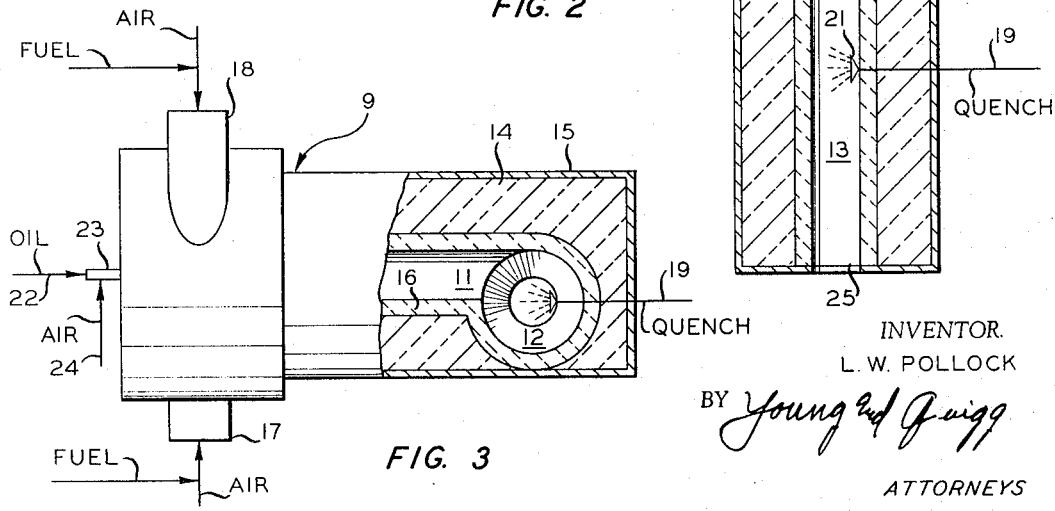
FIG. 3
INVENTOR.
L. W. POLLOCK
BY Young and Quigg
ATTORNEYS United States Patent Office 3,303,000
Patented Feb. 7, 1967

3,303,000
PRODUCTION OF CARBON BLACK
Lyle W. Pollock, Bartlesville, Okla., assignor to Phillips Petroleum Company, a corporation of Delaware
Filed Mar. 15, 1963, Ser. No. 265,430
4 Claims. (Cl. 23—209.4)

This invention relates to the production of carbon black. In one aspect this invention relates to the production of furnace carbon black having higher than normal properties of structure.

One of the most important properties of carbon black when used in the compounding of rubber for use in tire manufacturing is commonly referred to as "structure." The term "structure" as applied herein to carbon black refers to characteristics of the carbon black particles which relate to flocculation of said particles. The structure is said to be high when there is a strong tendency for the particles to form chains of particles. Conversely, the structure is said to be low when there is little tendency to form such chains. There is a close correlation between the structure of a carbon black and certain properties, for example, modulus, of a rubber product compounded with said carbon black. Other properties being comparable, high structure carbon blacks normally yield high modulus rubber and low structure carbon blacks normally yield low modulus rubber.

"High structure" carbon black is generally considered to have an oil absorption value of about 1.35 to 1.45 cc. per gram and this is the usual range for the well-known furnace blacks. "Normal structure" carbon black is considered to have an oil absorption value of about 0.75 to 1.2 cc. per gram and such blacks have in the past generally been made by the channel black process. "Low structure" carbon black is considered to have an oil absorption value of about 0.45 to 0.55 cc. per gram and such blanks are generally made by the thermal process.

Since it is not convenient to measure the structure of carbon black directly, the oil absorption of the black is commonly used as a measure of the structure. It has been found that the oil absorption of a carbon black correlates closely with certain properties, such as modulus, of a rubber having the carbon black compounded therein. Measurement of the oil absorption gives a quick and reliable measure of the structure of the carbon black. It is thus possible to obtain a rapid measurement of one of the most important properties of carbon black insofar as rubber compounds are concerned which are prepared from said carbon black.

The present invention provides a method and means for producing furnace carbon black having higher than normal properties of structure by concentrating the carbon black particles in the formative stage in the reactor. The high structure furnace carbon black produced according to the method and means of this invention is particularly desirable for certain applications such as the preparation of rubber tire tread stocks. According to the method of this invention and by utilizing the apparatus of this invention, an added centrifugal motion is imparted to the contents of the carbon black reactor so that the particles are stratified and therefore concentrated in an area of the carbon black reactor during the formative stage of the carbon black particles.

It is therefore an object of this invention to provide a method for producing furnace carbon blacks having higher than normal properties of structure. It is also an object of this invention to provide a means for the manufacture of furnace carbon black having a higher than normal value of structure. Still another object of the invention is to provide a method and means for increasing the relative concentration of carbon black particles in a carbon black furnace during the formative stage of the carbon black particles. Other objects and advantages will be apparent to one skilled in the art upon studying this disclosure including the detailed description of the invention and the appended drawing wherein:

FIGURE 2 is a sectional elevation illustrating one form of apparatus which can be employed in the practice of the invention;

FIGURE 3 is a plan view of the apparatus of FIGURE 2 including a section along line 3—3 of FIGURE 2; and FIGURE 4 is a graphic illustration of the relationship of carbon black concentration in a carbon black furnace to the structure of the carbon black produced as evidenced by the oil absorption value of the carbon black.

Figure 1:
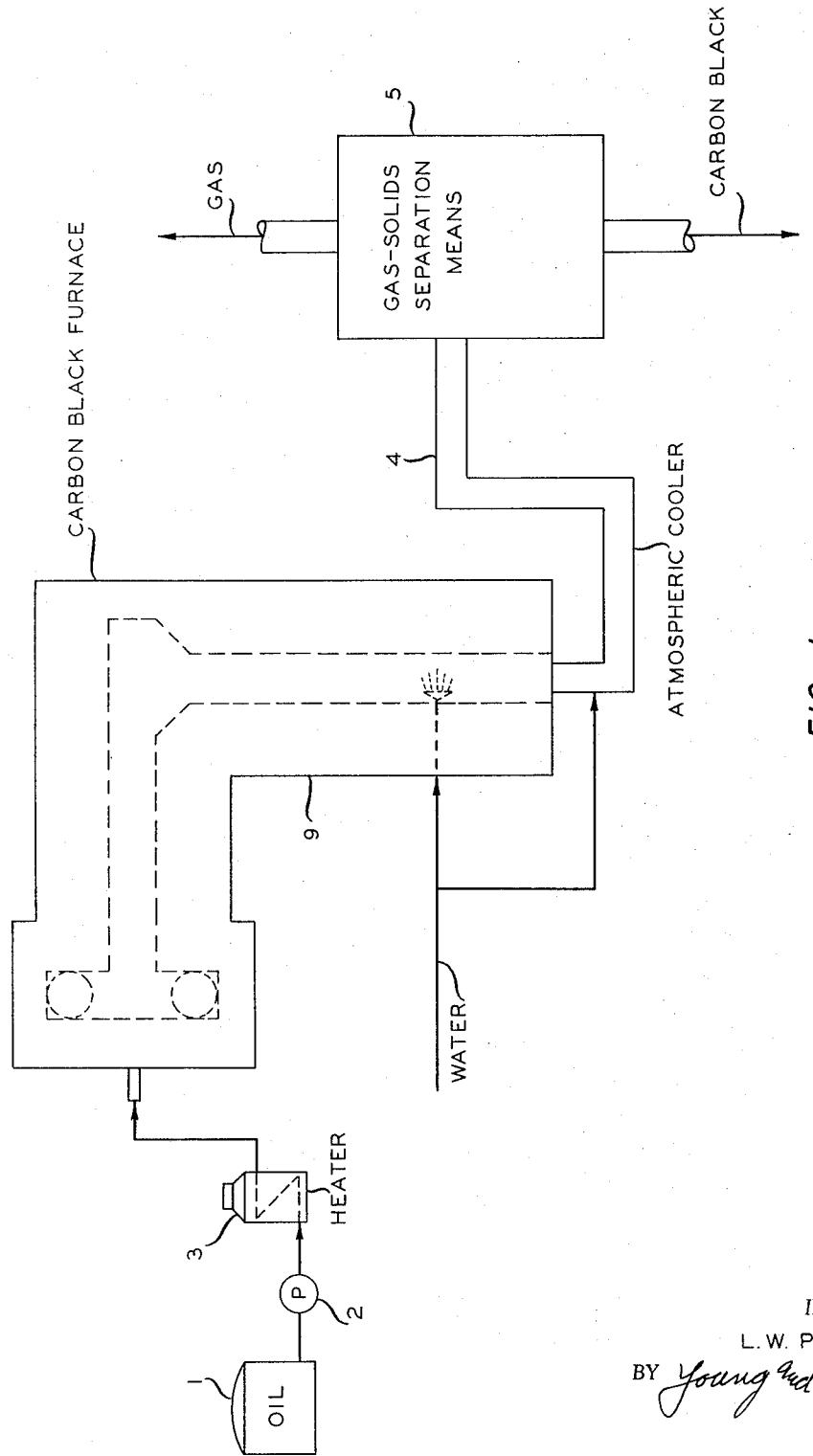
FIGURE 1 is a schematic flow diagram of a carbon black producing apparatus according to the invention.

FIGURE 2 illustrates the preferred carbon black furnace 9 utilized in the practice of the invention and comprises a precombustion chamber 10, a first reactor section 11, a second reactor section 12 and a quench section 13. The furnace is insulated by a layer of insulating material 14 and the entire apparatus is covered by a steel shell 15 as is conventional in the prior art. A lining 16 of highly refractory material, such as sillimanite, alumina or other refractory material, encloses the reactor sections of the furnace. The precombustion section 10 of the furnace has a diameter greater than its length and is essentially a precombustion chamber in which a combustible mixture of a gas such as natural gas and an oxygen-containing gas such as air, is burned. Said combustible mixture is injected into said precombustion chamber 10 through inlet tubes or tunnels 17 or 18 which are positioned so that the gases enter the precombustion chamber in a direction tangent to the cylindrical wall thereof. Upon continued injection of the combustible mixture, the flame and combustion products follow a spiral path toward the axis of the precombustion chamber and into the first section 11 of the reaction chamber which is smaller in diameter than is the precombustion chamber and which has a length somewhat longer than that of the precombustion chamber wherein the gaseous flow changes from a spiral to a helix and then passes tangentially into the second section 12 of the reaction chamber comprising a conical enlarged portion of the reaction chamber whose axis is normal to that of the precombustion chamber and first section of the reaction chamber whereby the helix of reaction chamber contents has imparted to it a spin so that carbon black particles in the formative stage are thrown outwardly by centrifugal force and are concentrated in a layer adjacent and spaced from the reaction chamber wall. The whirling stream of gases and carbon black particles is then passed through the smaller end of the conical section 12 and to the quench section 13 of the furnace which comprises a zone or chamber wherein the reactor effluent gases are cooled rapidly so as to prevent further reaction. A conduit 19 conducts water, from a source not shown, to a spray nozzle 21 disposed inside the quench section 13 for cooling or quenching the furnace effluent gases. The portion of the furnace which extends from the outlet of the frusto-conical section 12 to the quench 19, i.e., section 12a, is a part of the reaction section because reaction continues until the gases are quenched to below reaction temperature.

Reactant hydrocarbon gas or oil from a source 1, shown in FIGURE 1, passes through a pump 2 and a heater 3, also shown in FIGURE 1, and then through feed conduit 22 which is arranged so that feed introduced therethrough will pass axially through the precombustion chamber 10 and then into the first section 11 of the reactor. Surrounding the feed conduit 22 is a larger conduit 23, referred to as an "air jacket." The arrangement of the two conduits 22 and 23 is such that there is an annular space through which air is introduced via conduit 24 so that a layer of air surrounds the stream of reactant hydrocarbon passing into the carbon black furnace to keep the inner end of the feed conduit 22 cool and to prevent the deposition of carbon thereon.

The mixture of reaction gases, steam and carbon black particles passes out of the outlet 25 of the carbon black furnace quench section to conventional cooling means 4 and separation means 5 where the carbon black is recovered as the product of the process. For example, the cooling means 4 can be an atmospheric cooler comprising a length of bare pipe with or without additional water quench. The separation means 5 can be a cyclone separator or a bag filter or a combination of cyclone separator and bag filter.

In the reactor section of the carbon black furnace the reactants are subjected to centrifugal force so that the particles are formed and grow in an area of high concentration of carbon black particles. The mechanics of the formation of carbon black of high structure in this relatively concentrated area is not fully understood but is believed to be due, at least in part, to an increase in the number or rate of collisions of the carbon black particles during the growth period of the particle and the ability of the particles to cohere after collision to form chains of particles. This should not be confused with agglomerating the chains of carbon black particles which have been formed and cooled to below reaction temperature by the quench at the outlet of the reaction zone. The structure of carbon black is not measurably affected by agglomerating the carbon black after the particles have been quenched to below reaction temperature.

The data plotted in FIGURE 4 show the relationship of carbon black concentration to oil absorption in 17 runs with increasing concentration of carbon black in the reactor. These data show that carbon black having an oil absorption of 1.69 was obtained with a carbon black concentration of 7.2 lb. per thousand cubic feet of gas.

Any reactant hydrocarbon suitable for use in a conventional carbon black furnace can be employed in the practice of the invention. The more aromatic fractions of hydrocarbon are preferred because of greater yield of carbon black and because of favorable heat balance in the reactor. The extract oil from a solvent extraction operation is a particularly suitable feed stock.

The precombustion chamber 10 of FIGURE 2 should have a diameter greater than length as in a conventional precombustion type furnace. The diameter of the first reactor section 11 should be less than that of the precombustion chamber and the length can be greater than the diameter of section 11. The second reactor section 12, which is a form of cyclone separator, should have a diameter equal to, or greater than, that of the first reactor section 11. For example, the diameter of section 12 can be about 2 to 3 times the diameter of section 11. The outlet or downstream end of cyclonic device 12 can have a diameter about the same as that of section 11. The length of the section between the outlet of cyclonic device 12 and the quench 13 will be determined by the location of the quench so that the total reaction chamber length will be about the same as that of a conventional carbon black furnace of the tangential flame, precombustion type.

That which is claimed is:

1. In a carbon black furnace of the tangential flame, precombustion type comprising a cylindrical precombustion chamber positioned contiguously, coaxially and in open communication with a cylindrical reaction chamber the combination therewith of means comprising a cyclone separator section having a diameter about 2 to 3 times that of the reaction chamber positioned in said reaction chamber with its axis normal to that of the reaction chamber so as to impart a change of direction of flow and a simultaneous centrifugal spin to the reactants in said reaction chamber thereby to concentrate solid particles in the reaction chamber in a layer adjacent the wall of the reaction chamber.

2. A carbon black furnace comprising in serial, connected relationship a cylindrical precombustion chamber having a diameter greater than length; a cylindrical first reaction chamber section having a smaller diameter than that of said precombustion chamber in open communication axially and contiguously with said precombustion chamber; a frusto-conical second reaction chamber section having a greatest diameter 2 to 3 times that of the first reaction chamber in open, contiguous communication with said first reaction chamber section with the axis of said first reaction chamber section being tangent to the axis of said second reaction chamber section at its greatest diameter so as to impart an added centrifugal spin to the reactants entering therein; a cylindrical third reaction chamber section in open, axial and contiguous communication with the second reaction chamber at its least diameter; a quench means in said third reaction chamber section; means to introduce reactant fluid to said precombustion chamber; and means to remove quenched products from said third reaction chamber section.

3. A carbon black furnace comprising in serial, connected relationship a heat-insulated, cylindrical precombustion chamber having a diameter greater than length; a heat-insulated, cylindrical first reaction chamber section having a smaller diameter than that of said precombustion chamber in open communication axially and contiguously with said precombustion chamber; a heat-insulated, frusto-conical second reaction chamber section having a greatest diameter 2 to 3 times that of the first reaction chamber in open, contiguous communication with said first reaction chamber section with the axis of said first reaction chamber section being tangent to the axis of said second reaction chamber section at its greatest diameter so as to impart an added centrifugal spin to the reactants entering therein; a heat-insulated, cylindrical third reaction chamber section in open, axial and contiguous communication with the second reaction chamber at its least diameter; a quench means in said third reaction chamber section; means to introduce reactant fluid to said precombustion chamber; and means to remove quenched products from said third reaction chamber section.

4. In a process for producing carbon black in a carbon black furnace wherein said furnace comprises a precombustion section having a diameter greater than its length communicating axially with a reaction section having a diameter less than that of the precombustion section and a length greater than that of the precombustion section, wherein combustion products, resulting from burning a combustible mixture of a fuel and an oxygen-containing gas, are passed into said precombustion section in a direction tangent to the cylindrical wall thereof and follow a spiral path into the reaction section, and wherein a reactant hydrocarbon is passed axially through said precombustion section and into said reaction section, the improvement comprising passing the reaction section contents tangentially into a frusto-conical section whose axis is normal to that of the reaction section and communicating with said reaction section whereby an additional centrifugal spin is imparted to the contents of the reaction zone so that carbon black particles in the formative stage are concentrated in a layer in the frusto-conical section; and recovering the carbon black produced.

References Cited by the Examiner
UNITED STATES PATENTS
2,564,700   8/1951   Krejci _____ 23—209.4

OSCAR R. VERTIZ, *Primary Examiner.*

E. J. MEROS, *Assistant Examiner.*